(12) United States Patent
Xie et al.

(10) Patent No.: US 11,947,700 B2
(45) Date of Patent: Apr. 2, 2024

(54) DATA ACCESS CONTROL METHOD AND DATABASE ACCESS APPARATUS

(71) Applicant: Huawei Technologies Co., Ltd., Shenzhen (CN)

(72) Inventors: Qigang Xie, Shanghai (CN); Chaohua Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 812 days.

(21) Appl. No.: 17/072,794

(22) Filed: Oct. 16, 2020

(65) Prior Publication Data
US 2021/0034777 A1    Feb. 4, 2021

Related U.S. Application Data

(63) Continuation of application No. PCT/CN2019/080813, filed on Apr. 1, 2019.

(30) Foreign Application Priority Data

Apr. 19, 2018    (CN) .......................... 201810354338.5

(51) Int. Cl.
*G06F 21/62* (2013.01)
*G06F 16/21* (2019.01)
(Continued)

(52) U.S. Cl.
CPC .......... *G06F 21/6227* (2013.01); *G06F 16/21* (2019.01); *G06F 16/221* (2019.01); *G06F 21/78* (2013.01); *G06F 2221/2141* (2013.01)

(58) Field of Classification Search
CPC .... G06F 21/6227; G06F 16/21; G06F 16/221; G06F 21/78; G06F 2221/2141; G06F 16/2455; G06F 21/45
See application file for complete search history.

(56) References Cited

U.S. PATENT DOCUMENTS

| 7,711,750 B1 | 5/2010 | Dutta et al. |
| 9,002,803 B2 * | 4/2015 | Qayyum ............ G06F 21/6218 707/687 |

(Continued)

FOREIGN PATENT DOCUMENTS

| CN | 1967560 A | 5/2007 |
| CN | 103065100 A | 4/2013 |

(Continued)

OTHER PUBLICATIONS

Jindou, J., "Research and Design of Access Control Scheme for Web of Things Environment", Beijing University of Posts and Telecommunications, 2013, 2 pages (abstract).

*Primary Examiner* — Christopher A Revak
(74) *Attorney, Agent, or Firm* — Slater Matsil, LLP

(57) ABSTRACT

A data access control method and a database access apparatus. The method includes: obtaining a first data operation instruction, where the instruction is triggered by a first user; querying permission setting information based on the identifier of the target data body, and determining permission of the first user to operate the target data body, where the permission setting information includes an identifier of at least one data body and permission of at least one user to operate the at least one data body; generating a second data operation instruction based on the permission of the first user to operate the target data body and the first data operation instruction; and executing the second data operation instruction to operate data in the target data body within a target range, where the target range is a range allowed by the permission of the first user to operate the target data body.

20 Claims, 4 Drawing Sheets

(51) Int. Cl.
*G06F 16/22* (2019.01)
*G06F 21/78* (2013.01)

(56) References Cited

U.S. PATENT DOCUMENTS

| | | | |
|---|---|---|---|
| 9,286,475 B2 * | 3/2016 | Li | G06F 16/21 |
| 10,346,397 B2 * | 7/2019 | Khuong | G06F 16/24568 |
| 2004/0044655 A1 | 3/2004 | Cotner et al. | |
| 2013/0218911 A1 | 8/2013 | Li et al. | |
| 2014/0181134 A1 * | 6/2014 | Hermanns | G06F 21/6227 707/759 |
| 2017/0024572 A1 | 1/2017 | Ferraiolo et al. | |
| 2018/0012031 A1 | 1/2018 | Block et al. | |
| 2018/0060603 A1 | 3/2018 | Ahmed et al. | |
| 2019/0114341 A1 * | 4/2019 | Schukovets | G06F 16/244 |
| 2020/0193037 A1 * | 6/2020 | Peng | G06F 21/604 |

FOREIGN PATENT DOCUMENTS

| | | | |
|---|---|---|---|
| CN | 104683348 A | 6/2015 | |
| CN | 106250782 A | 12/2016 | |
| CN | 106469282 A | 3/2017 | |
| CN | 106570406 A | 4/2017 | |
| CN | 107239711 A | 10/2017 | |
| CN | 107403106 A | 11/2017 | |
| CN | 107503106 A | 12/2017 | |
| CN | 108874863 A | 11/2018 | |
| JP | 2002149494 A | 5/2002 | |
| WO | WO 2021/208758 A1 * | 10/2021 | G06F 21/31 |

* cited by examiner

DATA ACCESS CONTROL METHOD AND DATABASE ACCESS APPARATUS

CROSS-REFERENCE TO RELATED APPLICATIONS

This application is a continuation of International Application No. PCT/CN2019/080813, filed on Apr. 1, 2019, which claims priority to Chinese Patent Application No. 201810354338.5, filed on Apr. 19, 2018. The disclosures of the aforementioned applications are hereby incorporated by reference in their entireties.

TECHNICAL FIELD

Embodiments of this application relate to the data storage field, and in particular, to a data access control method and a database access apparatus.

BACKGROUND

A database is a warehouse that organizes, stores, and manages data according to a data structure. A user can add, intercept, update, and delete data in the database.

Generally, the user may write structured query language (SQL) code to query the database, and export report data from the database. A database administrator (DBA) usually can only set permission for the user, for example, forbidding a user A from accessing Table 1. In some approaches, a specific operation performed by the user on data in a table cannot be limited. In this way, the user A may view all data other than data in Table 1. This likely imposes a great information security risk on some industries such as high technology, information, and finance.

SUMMARY

Embodiments of this application provide a data access control method and a database access apparatus, to provide security assurance for data access and avoid an information leakage risk to some extent.

To achieve the foregoing objective, the following technical solutions are used in the embodiments of this application.

According to a first aspect, a data access control method is disclosed. The method includes: obtaining, by a database access apparatus, a first data operation instruction, where the first data operation instruction carries an identifier of a target data body, and the first data operation instruction is triggered by a first user. In other words, the target data body is a data body that the user wants to operate by using the first data operation instruction. The database access apparatus further pre-stores permission setting information, and the permission setting information includes an identifier of at least one data body and permission of at least one user to operate the at least one data body. The at least one data body described herein includes the target data body, and the at least one user includes the first user. Further, the database access apparatus may further query the permission setting information based on the identifier of the target data body, and determine permission of the first user to operate the target data body. Then, the database access apparatus may further generate a second data operation instruction based on the permission of the first user to operate the target data body and the first data operation instruction. Finally, the database access apparatus executes the second data operation instruction to operate data in the target data body within a target range, where the target range is a range allowed by the permission of the first user to operate the target data body.

According to the data access control method provided in this embodiment of the present disclosure, an SQL statement entered by the user may be automatically modified based on the permission setting information, an execution condition of the SQL statement (namely, permission of the user to access the data body, for example, row permission or column permission) is added, and then a modified SQL statement is executed to perform permission control on a table, a row, and a column by the user. In this way, a sensitive column or a sensitive row in the table may be protected. This can provide security assurance for data access and avoid an information leakage risk to some extent.

With reference to the first aspect, in a first possible implementation of the first aspect, if the permission of the first user to operate the target data is prohibiting the first user from operating at least one target field in the target data body, the generating a second data operation instruction based on the permission of the first user to operate the target data body and the first data operation instruction further includes: adding, by the database access apparatus, an execution condition to the first data operation instruction to obtain the second data operation instruction, and in the execution condition, a value corresponding to the target field operated by the first user is null.

In other words, in this embodiment of the present disclosure, the column permission may be controlled by modifying the SQL statement to set the value corresponding to the target field to null.

With reference to the first possible implementation of the first aspect, in a second possible implementation of the first aspect, the executing the second data operation instruction to operate data in the target data body within a target range further includes: operating, by the database access apparatus, N columns of data in another field in the target data body other than the target field, and forbidding operating M columns of data in the target field in the target data body, where N is an integer greater than or equal to 1, and M is an integer greater than or equal to 1.

In other words, when the value of the target field in the execution condition of the SQL statement is null, the user is forbidden to operate a column of data in the field. Therefore, the column of data queried by the user is always null. This protects data in the sensitive column.

With reference to the first aspect, in a third possible implementation of the first aspect, if the permission of the first user to operate the target data body is allowing the first user to operate the data in the target data body when a target field meets a preset condition, the generating a second data operation instruction based on the permission of the first user to operate the target data body and the first data operation instruction further includes: adding, by the database access apparatus, an execution condition to the first data operation instruction to obtain the second data operation instruction, and when the target field in the execution condition meets the preset condition, the second data operation instruction is used to indicate that the first user is allowed to operate the target data body when the target field meets the preset condition.

In other words, in this embodiment of the present disclosure, the column permission may be controlled by modifying the SQL statement to add a condition that needs to be met by the target field.

With reference to the third possible implementation of the first aspect, in a fourth possible implementation of the first aspect, the executing the second data operation instruction to operate data in the target data body within a target range further includes: operating, by the database access apparatus, Q rows of data, in the target data body, whose target field meets the preset condition, where Q is an integer greater than or equal to 1.

In other words, when the value of the target field in the execution condition of the SQL statement needs to meet the preset condition, the user is allowed to operate only the data that is in the field and that is within the allowed range of the preset condition. This protects data in the sensitive row.

According to a second aspect, a database access apparatus is disclosed. The database access apparatus includes: an obtaining unit, configured to obtain a first data operation instruction, where the first data operation instruction carries an identifier of a target data body, and the first data operation instruction is triggered by a first user; a query unit, configured to query permission setting information based on the identifier of the target data body, and determine permission of the first user to operate the target data body, where the permission setting information includes an identifier of at least one data body and permission of at least one user to operate the at least one data body, the at least one data body includes the target data body, and the at least one user includes the first user; a generation unit, configured to generate a second data operation instruction based on the permission of the first user to operate the target data body and the first data operation instruction; and an operation unit, configured to execute the second data operation instruction to operate data in the target data body within a target range, where the target range is a range allowed by the permission of the first user to operate the target data body.

According to the database access apparatus provided in this embodiment of the present disclosure, an SQL statement entered by the user may be automatically modified based on the permission setting information, an execution condition of the SQL statement (namely, permission of the user to access the data body, for example, row permission or column permission) is added, and then a modified SQL statement is executed to perform permission control on a table, a row, and a column by the user. In this way, a sensitive column or a sensitive row in the table may be protected. This can provide security assurance for data access and avoid an information leakage risk to some extent.

With reference to the second aspect, in a first possible implementation of the second aspect, if the permission of the first user to operate the target data is prohibiting the first user from operating at least one target field in the target data body, the generation unit is further configured to add an execution condition to the first data operation instruction to obtain the second data operation instruction, and in the execution condition, a value corresponding to the target field operated by the first user is null.

With reference to the first possible implementation of the second aspect, in a second possible implementation of the second aspect, the operation unit is further configured to: operate N columns of data in another field in the target data body other than the target field, and forbid operating M columns of data in the target field in the target data body, where N is an integer greater than or equal to 1, and M is an integer greater than or equal to 1.

With reference to the second aspect, in a third possible implementation of the second aspect, if the permission of the first user to operate the target data body is allowing the first user to operate the data in the target data body when a target field meets a preset condition, the generation unit is further configured to add an execution condition to the first data operation instruction to obtain the second data operation instruction, and when the target field in the execution condition meets the preset condition, the second data operation instruction is used to indicate that the first user is allowed to operate the target data body when the target field meets the preset condition.

With reference to the third possible implementation of the second aspect, in a fourth possible implementation of the second aspect, the operation unit is further configured to operate Q rows of data, in the target data body, whose target field meets the preset condition, where Q is an integer greater than or equal to 1.

According to a third aspect, a database access apparatus is disclosed. The database access apparatus includes: a transceiver, configured to obtain a first data operation instruction, where the first data operation instruction carries an identifier of a target data body, and the first data operation instruction is triggered by a first user; and a processor, configured to query permission setting information based on the identifier of the target data body, and determine permission of the first user to operate the target data body, where the permission setting information includes an identifier of at least one data body and permission of at least one user to operate the at least one data body, the at least one data body includes the target data body, and the at least one user includes the first user, where the processor is further configured to generate a second data operation instruction based on the permission of the first user to operate the target data body and the first data operation instruction, and configured to execute the second data operation instruction to operate data in the target data body within a target range, where the target range is a range allowed by the permission of the first user to operate the target data body.

According to the database access apparatus provided in this embodiment of the present disclosure, an SQL statement entered by the user may be automatically modified based on the permission setting information, an execution condition of the SQL statement (namely, permission of the user to access the data body, for example, row permission or column permission) is added, and then a modified SQL statement is executed to perform permission control on a table, a row, and a column by the user. In this way, a sensitive column or a sensitive row in the table may be protected. This can provide security assurance for data access and avoid an information leakage risk to some extent.

With reference to the third aspect, in a first possible implementation of the third aspect, if the permission of the first user to operate the target data is prohibiting the first user from operating at least one target field in the target data body, the processor is further configured to add an execution condition to the first data operation instruction to obtain the second data operation instruction, and in the execution condition, a value corresponding to the target field operated by the first user is null.

With reference to the first possible implementation of the third aspect, in a second possible implementation of the third aspect, the processor is further configured to: operate N columns of data in another field in the target data body other than the target field, and forbid operating M columns of data in the target field in the target data body, where N is an integer greater than or equal to 1, and M is an integer greater than or equal to 1.

With reference to the third aspect, in a third possible implementation of the third aspect, if the permission of the first user to operate the target data body is allowing the first user to operate the data in the target data body when a target field meets a preset condition, the processor is further configured to add an execution condition to the first data operation instruction to obtain the second data operation instruction, and when the target field in the execution condition meets the preset condition, the second data operation instruction is used to indicate that the first user is allowed to operate the target data body when the target field meets the preset condition.

With reference to the third possible implementation of the third aspect, in a fourth possible implementation of the third aspect, the processor is further configured to operate Q rows of data, in the target data body, whose target field meets the preset condition, where Q is an integer greater than or equal to 1.

DETAILED DESCRIPTION OF ILLUSTRATIVE EMBODIMENTS

First, in this embodiment of the present disclosure, the first and the second are merely intended to distinguish between different objects, and do not represent a sequence. In addition, terms used in the embodiments of the present disclosure are explained and described. Further:

(1) A database may be considered as a warehouse that organizes and stores data according to a data structure, and a user may manage data in the database, for example, data query, data deletion, data addition, and data update. There are many types of databases, such as oracle, MySQL, PostgreSQL, DB2, and IQ.

(2) A data body may be considered as a specific data structure used to store data in a database, for example, a table or a view. The table includes a row and a column, and both the row and the column can store data. The view is a virtual table. Like a real table, the view includes a column and a row.

(3) A field can be considered as an attribute value in a table and is used to describe a data attribute. For example, as shown in the following Table 1, "name", "income", and "age" are all fields in Table 1. "A, B, C, and D" are data in the "name" field. "8K, 12K, 5K, and 15K" are data in the "income" field. "25, 28, 27, and 30" are data in the "age" field. The "name" field is recorded as "C1", the "income" field is recorded as "C2", and the "age" field is recorded as "C3".

TABLE 1

| Name (C1) | Income (C2) | Age (C3) |
|---|---|---|
| A | 8K | 25 |
| B | 12K | 28 |
| C | 5K | 27 |
| D | 15K | 30 |

Figure 1:
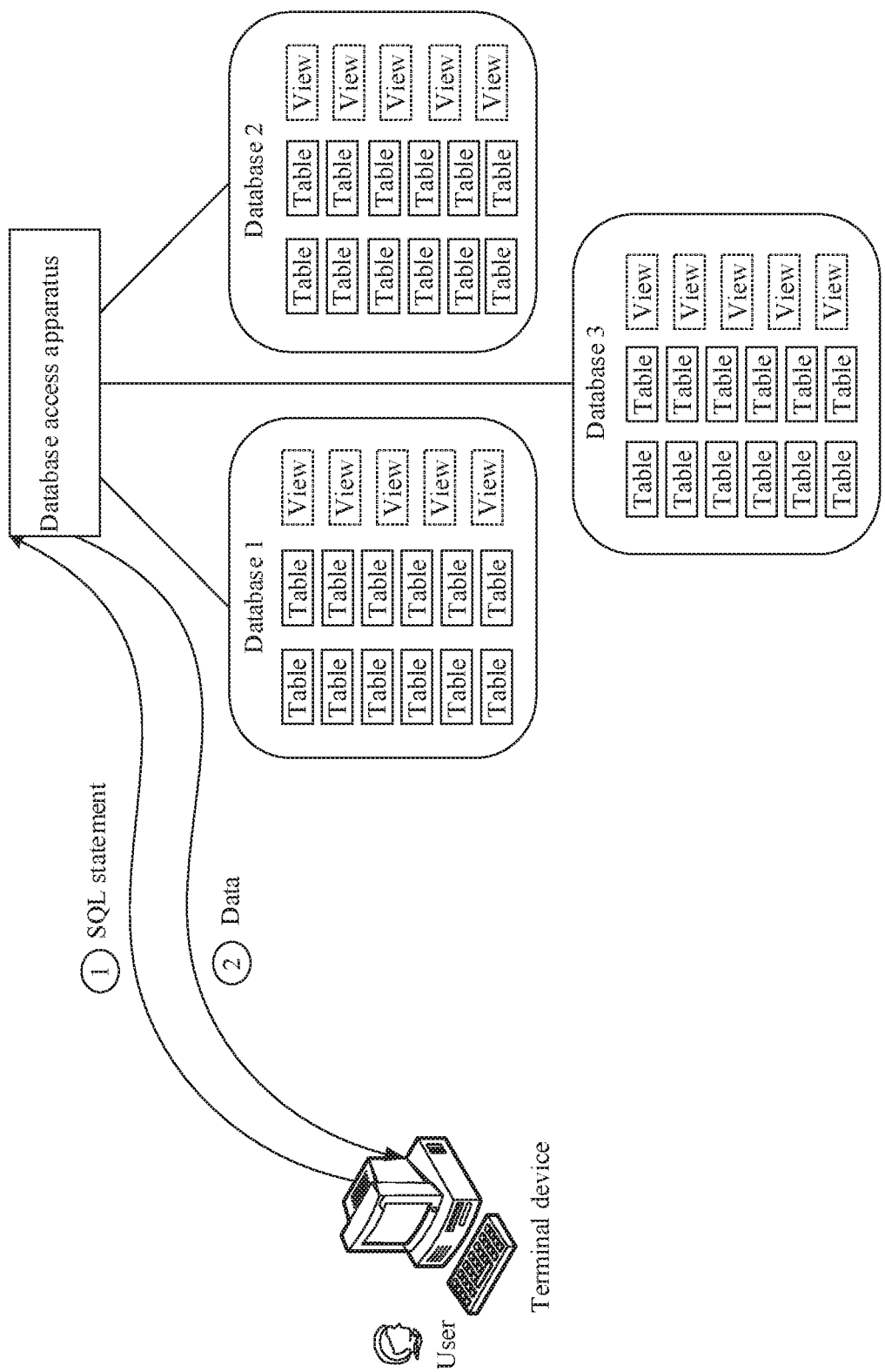
FIG. 1 is an architectural diagram of a data access system according to an embodiment of this application.

FIG. 1 is an architectural diagram of a data access system according to an embodiment of the present disclosure. Referring to FIG. 1, in a database access apparatus, a user may log in to a terminal device by using an account name and a password. Further, the user may further write an SQL statement on the terminal device. The terminal device may query, by using the SQL statement entered by the user, data in each database coupled to the database access apparatus. The database may include a data body that stores data, for example, a table or a view. For example, the SQL statement entered by the user on the terminal device is "select*from T1", in other words, query data in Table 1. Further, the terminal device transmits the SQL statement entered by the user to the database access apparatus. After receiving the SQL statement from the terminal device, the database access apparatus may determine whether the user has permission to query Table 1. If the user has the permission to query Table 1, the user is allowed to query all data in Table 1. For example, the data in Table 1 is sent to the terminal device for viewing by the user.

However, permission control can be performed only at a user granularity. If a user is allowed to view a table, the user can operate all data in the table. Actually, for industries such as high technology, information, and finance, permission control is required if data in a sensitive column (such as a unit price and costs) or a sensitive row (such as data of a province) in a table is sensitive data. If permission control is not performed on the user, the user can view all data including sensitive data in the table. This may cause a great information security risk and a management loophole.

In a data access control method provided in this embodiment of the present disclosure, permission setting information is preset. The permission setting information includes permission of the user to operate the data body, for example, permission to view information about a person whose age is greater than 50. The database access apparatus first obtains a first data operation instruction entered by the user on the terminal device, and may further determine, based on a data body identifier carried in the first data operation instruction, permission of the user to operate a target data body. The database access apparatus may further generate a second data operation instruction based on the permission of the user to operate the target data body and the first data operation instruction. Finally, the database access apparatus executes the second data operation instruction to operate data in the target data body within a target range, where the target range is a range allowed by the permission of the user to operate the target data body. It can be learned that, according to the method provided in this embodiment of the present disclosure, the SQL statement entered by the user may be automatically modified based on the permission setting information, an execution condition of the SQL statement (namely, permission of the user to access the data body, for example, row permission or column permission) is added, and then a modified SQL statement is executed to perform permission control on a table, a row, and a column by the user. In this way, a sensitive column or a sensitive row in the table may be protected. This can provide security assurance for data access and avoid an information leakage risk to some extent.

Figure 2:
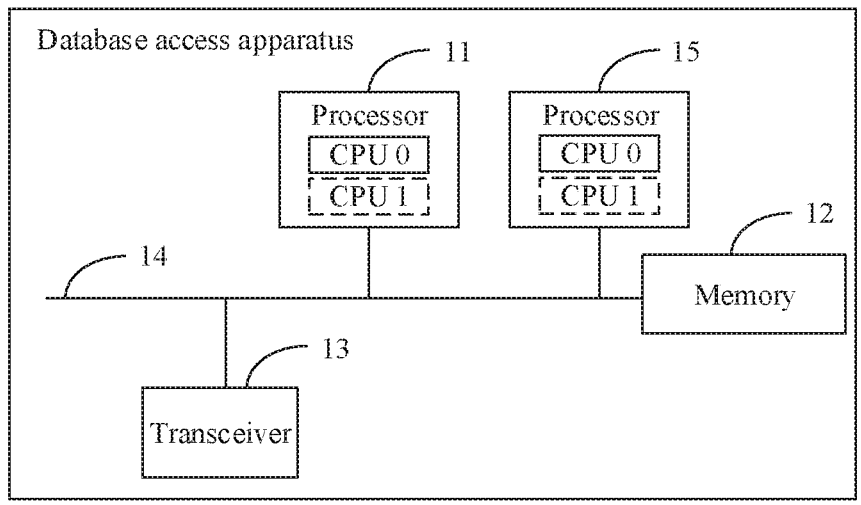
FIG. 2 is a structural block diagram of a database access apparatus according to an embodiment of the present disclosure.

The data access control method provided in this embodiment of the present disclosure may be applied to a database access apparatus, and the database access apparatus may be the database access apparatus in FIG. 1. As shown in FIG. 2, the database access apparatus may include at least one processor 11, a memory 12, a transceiver 13, and a communications bus 14.

The following describes components of the database access apparatus in detail with reference to FIG. 2.

The processor 11 is a control center of the database access apparatus, and may be one processor or may be an umbrella term of a plurality of processing elements. For example, the processor 11 may be a central processing unit (CPU), or an application specific integrated circuit (ASIC), or may be configured as one or more integrated circuits implementing this embodiment of the present disclosure, for example, one or more microprocessors (DSP) or one or more field programmable gate array (FPGA).

The processor 11 may implement various functions of the database access apparatus by running or executing a software program stored in the memory 12 and invoking data stored in the memory 12.

In a specific implementation, in an embodiment, the processor 11 may include one or more CPUs, for example, a CPU 0 and a CPU 1 that are shown in FIG. 2.

In a specific implementation, in an embodiment, the database access apparatus may include a plurality of processors, for example, the processor 11 and a processor 15 that are shown in FIG. 2. Each of the processors may be a single-core processor (single-CPU) or may be a multi-core processor (multi-CPU). The processor herein may be one or more database access apparatuses, circuits, and/or processing cores for processing data (for example, computer program instructions).

The memory 12 may be a read-only memory (ROM) or another type of static storage database access apparatus that can store static information and instructions, or random access memory (RAM) or another type of dynamic storage database access apparatus that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage database access apparatus, or any other medium that can be used to carry or store expected program code in a form of an instruction or a data structure and that can be accessed by a computer. However, the memory 12 is not limited thereto. The memory 12 may exist independently, and is coupled to the processor 11 through the communications bus 14. Alternatively, the memory 12 may be integrated with the processor 11.

The memory 12 is configured to store a software program for performing the solution in the present disclosure, and the processor 11 controls execution of the software program.

The transceiver 13 is configured to communicate with another apparatus by using any apparatus such as a transceiver, for example, communicating with the terminal device shown in FIG. 1. Certainly, the transceiver 13 may further be configured to communicate with a communications network, such as the Ethernet, a radio access network (RAN), or a wireless local area network (WLAN). The transceiver 13 may include a receiving unit for implementing a receiving function and a sending unit for implementing a sending function.

The communications bus 14 may be an industry standard architecture (ISA) bus, a peripheral database access apparatus interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The database access apparatus structure shown in FIG. 2 does not constitute a limitation on a database access apparatus, and the database access apparatus may include more or fewer components than those shown in the figure, or some components may be combined, or the components may be arranged in a different manner.

In this embodiment of the present disclosure, a database administrator generates permission setting information in advance based on an identity of each user, and writes the permission setting information into the memory 12 of the database access apparatus. Further, the transceiver 13 may obtain a first data operation instruction from the terminal device coupled to the database access apparatus, the processor 11 may further parse the first data operation instruction to determine all data bodies (namely, target data bodies) that the user wants to operate, and then determine, based on the permission setting information in the memory 12, whether the user has permission to operate the data body. If the user does not have the permission to operate, it is prompted that the user does not have the permission. If the user has the permission, the processor 11 further determines whether row permission (namely, permission of the user to operate a row of the data body) is set for the data body that the user wants to operate. If there exists row permission control, the processor 11 modifies the first data operation instruction by adding an execution condition, to generate a second data operation instruction. Certainly, whether column permission (namely, permission of the user to operate a column of the data body) is set for the data body that the user wants to operate needs to be further determined. If there exists column permission control, the first data operation instruction also needs to be modified by adding an execution condition, to hide a related column.

Finally, the processor 11 executes a modified data operation instruction, namely, the second data operation instruction, to operate data in the target data body within a target range, where the target range is a range allowed by the permission of the user to operate the target data body. Data access of the user is controlled by modifying the data operation instruction, to protect a sensitive column or a sensitive row in the table. This can provide security assurance for data access and avoid an information leakage risk to some extent.

Figure 3:
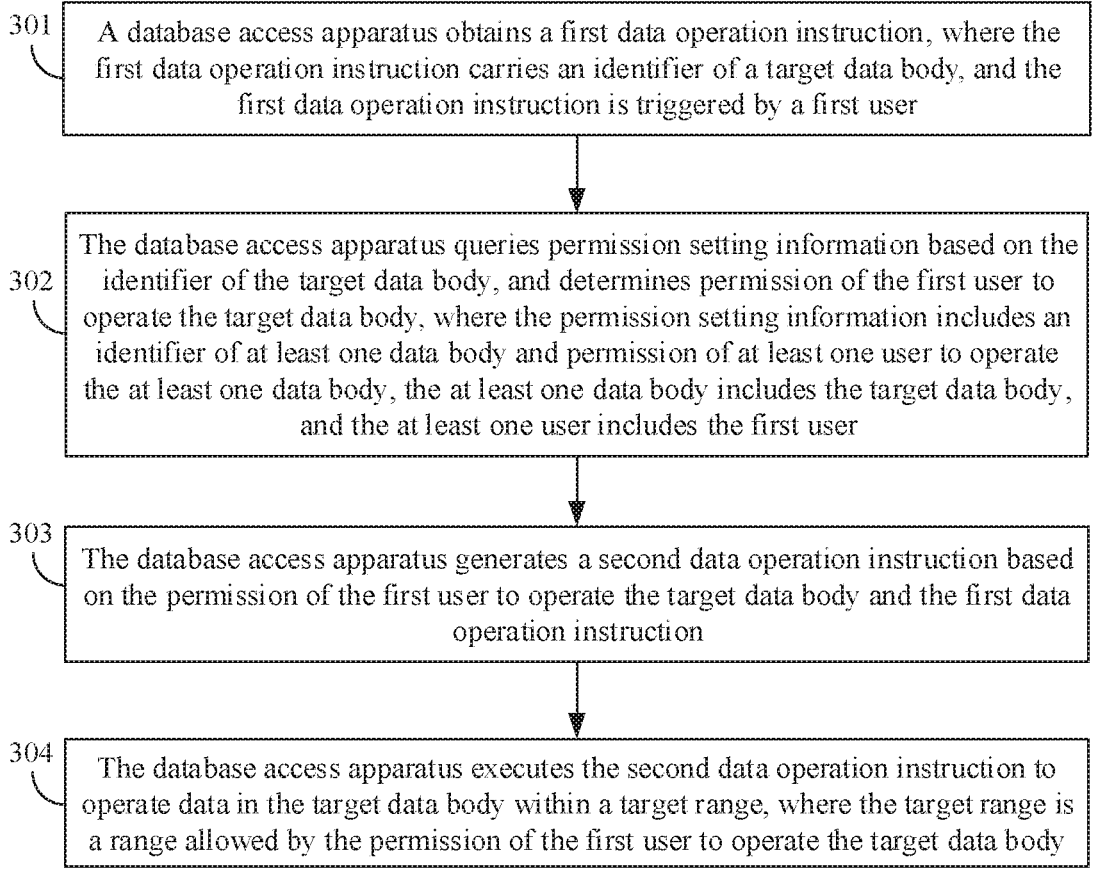
FIG. 3 is a schematic flowchart of a data access control method according to an embodiment of the present disclosure.

An embodiment of the present disclosure provides a data access control method. As shown in FIG. 3, the method includes the following steps:

301: A database access apparatus obtains a first data operation instruction, where the first data operation instruction carries an identifier of a target data body, and the first data operation instruction is triggered by a first user.

In specific implementation, the user logs in to a terminal device by entering an account name and a password. Further, when the user wants to access data in each database coupled to the database access apparatus, the user may enter the first data operation instruction on the terminal device, and the terminal device may transmit the first data operation instruction entered by the user to the database access apparatus, such that the database access apparatus may obtain the first data operation instruction triggered by the first user. In this embodiment of the present disclosure, the target data body may be considered as a data body that the user wants to operate by using the first data operation instruction, as shown in Table 1. An identifier of the data body may be a name of the data body. In an example in which the target data is a table, the identifier of the data body may be a name of the table, for example, "T1".

In addition, the data operation instruction in this embodiment of the present disclosure may be an SQL statement. For example, the first data operation instruction obtained by the database access apparatus is "select*from T1". It indicates that the user wants to query data in Table 1 (a table whose name is T1 is denoted as Table 1).

It should be noted that functions of the SQL statement include data query, data deletion, data addition, data update, and the like. In other words, functions of the data operation instruction include data query, data deletion, data addition, data update, and the like.

302: The database access apparatus queries permission setting information based on the identifier of the target data body, and determines permission of the first user to operate the target data body. The permission setting information includes an identifier of at least one data body and permission of at least one user to operate the at least one data body, the at least one data body includes the target data body, and the at least one user includes the first user.

In specific implementation, a database administrator of the database access apparatus may determine, based on information such as a role and service permission of each user, whether the data body can be operated by a user. Further, whether the data body includes a sensitive column further needs to be determined. If the data body includes the sensitive column, column permission needs to be set to prevent the user from operating data in the sensitive column. Certainly, if the data body includes a sensitive row, row permission also needs to be set to prevent the user from operating data in the sensitive row. In some embodiments, the row permission may be set by setting a value range of a field. For example, referring to Table 1, permission of the user A to operate Table 1 may be set to: Only related data of a person whose age is less than 30 is allowed to be operated. In this case, row permission of the user A to operate Table 1 is C1<30. In other words, the user A can operate the first three rows of data in Table 1. Certainly, the row permission of the user may also be set by setting a value of a field. For example, referring to Table 1, permission of the user A to operate Table 1 may be set to: Only related data of a person whose age is 25 is allowed to be operated. In this case, row permission of the user A to operate Table 1 is C1=25. In other words, the user A can operate the first row of data in Table 1. For another example, permission of the user A to operate Table 1 may be set to: Related data of a person whose age is 25 is not allowed to be operated. In this case, row permission of the user A to operate Table 1 is C1≠25. In other words, the user A may not be allowed to operate data in the first row in Table 1. Only other data in Table 1 can be operated such as data in the second row and data in the third row.

In some embodiments, the column permission may be set by setting a value of a field corresponding to the sensitive column to null. Similarly, referring to Table 1, permission of the user A to operate Table 1 may be set to: The user A is not allowed to access income information of a person. In other words, the user A is not allowed to operate data in the "income" field. In this case, column permission of the user A to operate Table 1 is C1=null. In other words, the user A cannot operate data in the second column of Table 1.

Further, the database access apparatus may further write the permission setting information into the memory of the database access apparatus, to subsequently search for the permission setting information to determine specific permission of a user to operate a data body. In this embodiment of the present disclosure, the permission setting information may be stored in the memory in a form of a table. The following Table 2 is a possible implementation of the permission setting information.

TABLE 2

| User identifier | Data body identifier | | | |
| --- | --- | --- | --- | --- |
| | T1 | T2 | T3 | ... |
| A | C5 > 1000 | C2 = null | C3 = 20 | ... |
| B | C4 = null | C4 < 100 | C2 = null | ... |
| C | C3 < 30 | C4 = null | C2 = null | ... |
| ... | ... | ... | ... | ... |

It should be noted that C2, C3, C5, and C4 in Table 2 are fields in the data body, for example, "age" and "income". Table 2 is merely an example of the permission setting information. The permission setting information in this embodiment of the present disclosure may alternatively be implemented in another possible manner. This is not limited in this embodiment of the present disclosure. In this embodiment of the present disclosure, the user identifier may be an account name. For example, if an account name of the user A is "A", an identifier of the user A may also be "A".

In addition, a "sensitive column" in this embodiment of the present disclosure refers to a column of data that needs to be kept confidential for a user, for example, "income" and "cost price". A "sensitive row" refers to a row of data that needs to be kept confidential for a user, for example, data of an employee whose age is 30.

In specific implementation, the database access apparatus may parse the first data operation instruction triggered by the first user, and determine the data body, namely, the target data body, that the first user wants to operate. Because the user logs in to the terminal device by using the account name and the password, when the terminal device transmits the first data operation instruction to the terminal device, the terminal device may further transmit the user identifier, for example, the account name, to the database access apparatus. Therefore, the database access apparatus may also determine the user identifier of the user. Further, the database access apparatus may query the permission setting information by using the identifier of the target data body and the user identifier of the first user, to determine the permission of the first user to operate the target data body. For example, an account name of the user A is "A". In other words, a user identifier of the user A is "A". It is assumed that a first data operation instruction input by the user A is "select * from T1", and a parsing instruction is "select * from T1". It can be determined that an identifier of the target data body is "T1". Further, permission setting information is queried based on the user identifier "A" of the user A and the identifier "T1" of the target data body, to determine permission of the user A to operate T1. For example, the permission setting information is Table 2. Table 2 is queried based on the user identifier "A" of the user A and the identifier "T1" of the target data body, and it is determined that the permission of the user A to operate T1 is C5>1000. In other words, the user A can operate all data that meets a condition that the C5 field is greater than 1000 in T1.

In some embodiments, the permission of the data body may be set for all users. In this case, the permission setting information may not include the user identifier. Table 3 is another possible implementation of the permission setting information. In this case, the database access apparatus only needs to query the permission setting information based on the identifier of the data body to determine specific permission of the user to operate a data body. For example, if the identifier of the target data body in the first data operation instruction entered by the first user is "T2", permission of the first user to operate the data body "T2" is: forbidding operating the C2 field in the data body "T2".

TABLE 3

| T1 | T2 | T3 | ... |
|---|---|---|---|
| C5 > 1000 | C2 = null | C3 = 20 | |

303: The database access apparatus generates a second data operation instruction based on the permission of the first user to operate the target data body and the first data operation instruction.

In specific implementation, the database access apparatus may modify the first data operation instruction based on the permission of the first user to operate the target data body, add an execution condition, and generate a new data operation instruction (namely, the second data operation instruction). The new data operation instruction may indicate the permission of the first user to operate the target data body.

In this embodiment of the present disclosure, limitation on the permission of the user to operate the data body includes row permission and column permission.

The column permission may be considered as limiting permission of the user to operate some columns in the data body, for example, forbidding the user from operating a sensitive column in the data body. In some embodiments, if the permission of the first user to operate the target data is: forbidding the first user from operating at least one target field (for example, a "cost price" field) in the target data body, the database access apparatus may add an execution condition to the first data operation instruction, to obtain the second data operation instruction. In the execution condition, a value corresponding to the target field operated by the first user is null.

For example, the first data operation instruction entered by the first user is "select * from T1 (select*from T1 where C2 in (10, 20, 30)")". In other words, the user wants to query all data that meets that the C2 field is equal to 10, 20, and 30 in the table T1. Further, the database access apparatus queries the permission setting information to determine that the permission of the first user to operate the target data body (T1 is used as an example, and it is assumed that the T1 table includes three fields: C1, C2, and C3) is: The C2 field in T1 is forbidden to be accessed. In other words, C2 is set to a sensitive column. The database access apparatus may modify the first data operation instruction to prevent the first user from operating data in the C2 field. For example, "select*from T1 (select*from T1 where C2 in (10, 20, 30))" is modified as:
  select T1.C1,
  T1.C2,
  T1.C3
  from (select C1, null C2, C3 from T1 where C2 in (10, 20, 30)) T1.

The C2 column is set to null. Therefore, data queried by the user in this column is always empty. This ensures that the data in the C2 column is not viewed by the user and ensures confidentiality of special data.

In addition, the row permission may be considered as limiting permission of the user to operate some rows in the data body, for example, forbidding the user from operating a sensitive row in the data body. In some embodiments, if the permission of the first user to operate the target data body is: allowing the first user to operate the data in the target data body when the target field meets a preset condition, that is, allowing the user to operate only data whose target field meets the preset condition in the data body. For example, the user is allowed to view only information about a person whose age is greater than 30. The database access apparatus adds an execution condition to the first data operation instruction to obtain the second data operation instruction, and when the target field in the execution condition meets the preset condition, the second data operation instruction is used to indicate that the first user is allowed to operate the target data body when the target field meets the preset condition.

For example, the first data operation instruction entered by the first user is "select*from T1". In other words, the user wants to query all data in the table T1. Further, the database access apparatus queries the permission setting information to determine that the permission of the first user to operate the target data body (T1 is used as an example, and it is assumed that the T1 table includes three fields: C1, C2, and C3) is: Only data whose C1>1000 is allowed to be accessed. In other words, N rows of data whose C1 field is greater than 10000 are set as sensitive rows. The database access apparatus may modify the first data operation instruction to prevent the first user from operating data less than 10000 in the C1 field. For example, "select*from T1" is modified as:

"select*from("select*from T1" where (C1>10000)) T1".

In this way, regardless of what SQL statement is entered by the user, the user cannot operate data whose C1 is greater than 10000 in T1, and the row permission control can be performed on the data body.

It should be noted that, in this embodiment of the present disclosure, the "row permission" is not limited to "allowing to access only data whose field is greater than a value", and may also be "allowing to access only data whose field is equal to a value" or "forbidding accessing data whose field is equal to a value". The foregoing "allowing access to only data whose C1>10000" is merely an example of the row permission. This is not limited in this embodiment of the present disclosure. Certainly, the "forbid accessing the C2 field in T1" is merely an example of the column permission, and a specific implementation of the column permission is also not limited in this embodiment of the present disclosure.

304: The database access apparatus executes the second data operation instruction to operate data in the target data body within a target range, where the target range is a range allowed by the permission of the first user to operate the target data body.

In other words, the database access apparatus may generate the second data operation instruction by adding the execution condition to the first data operation instruction entered by the user, and the finally executed second data operation instruction can indicate the permission of the user to operate the data body. Executing of the second data operation instruction may forbid the user from operating the sensitive row or the sensitive column, to protect sensitive data.

In specific implementation, if the permission of the first user to operate the target data is: The first user is forbidden from operating at least one target field in the target data body, the database access apparatus executes the second data operation instruction, and the user can operate N columns of data in another field in the target data body other than the target field, but cannot operate M columns of data in the target field in the target data body. N is an integer greater than or equal to 1, and M is an integer greater than or equal to 1.

If the permission of the first user to operate the target data body is: The first user is allowed to operate the data in the target data body when a target field meets a preset condition, the database access apparatus executes the second data operation instruction, and the user may operate Q rows of data whose target field meets the preset condition in the target data body, where Q is an integer greater than or equal to 1.

In some embodiments, a minimum unit of the data operation instruction may be parsed to determine the identifier of the data body, namely, the identifier of the target data body, that the user wants to access. For example, the parsed minimum unit may be a keyword (key Word, KW), a space or a newline character (SP), an identifier (NAME), or a number (NUM), or may be some symbols in the SQL statement, for example, an equal sign (=) or a comma (,), and so on.

The keyword may be a keyword in the SQL statement, for example, select, from, where, and, order by sum, substr. The identifier may include a table name, a field name, and the like.

The database access apparatus may place the parsed table name into an array, in other words, the identifier of the target data body is determined.

Figure 4:
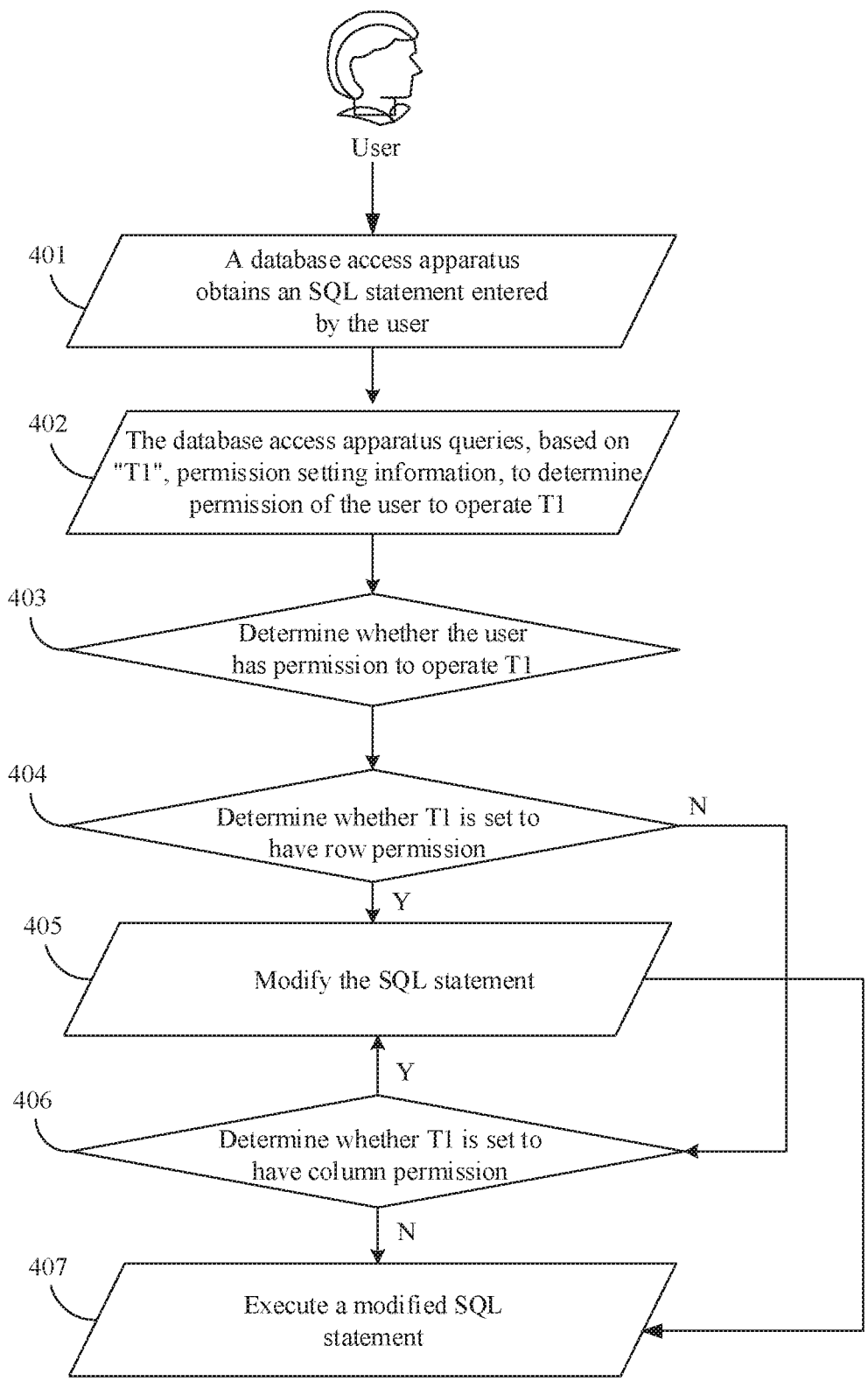
FIG. 4 is another schematic flowchart of a data access control method according to an embodiment of the present disclosure.

An embodiment of the present disclosure further provides a data access control method. As shown in FIG. 4, the method includes the following steps:

401: A database access apparatus obtains an SQL statement entered by a user. The SQL statement entered by the user carries an identifier "T1" of a data body that the user wants to access.

402: The database access apparatus queries, based on "T1", permission setting information, to determine permission of the user to operate T1.

403: The database access apparatus determines whether the user has permission to operate T1.

If the user does not have the permission to operate T1, it is prompted that the user does not have the permission to operate T1. A specific prompt manner may be: displaying a prompt box, and prompting the user by using a text in the prompt box, for example, displaying a text "You do not have permission to access Table 1, and please contact an administrator to modify the permission".

If the user has the permission to operate T1, step 404 is performed.

404: The database access apparatus determines whether row permission is set for T1.

If the row permission is set for T1, step 405 is performed to modify, based on the row permission set for T1, the SQL statement entered by the user, and add an execution condition, to prevent the user from operating data in a sensitive row.

If the row permission is not set for T1, step 406 is performed to continue to determine whether column permission is set for T1.

405: The database access apparatus modifies the SQL statement.

406: The database access apparatus determines whether column permission is set for T1.

If the column permission is set for T1, step 405 is performed to modify, based on the column permission set for T1, the SQL statement entered by the user, and add an execution condition, to prevent the user from operating data in a sensitive column.

If the column permission is not set for T1, step 407 is performed.

407: The database access apparatus executes a modified SQL statement.

It should be noted that, if the database access apparatus determines that the row permission and the column permission are set for T1, the database access apparatus needs to execute an SQL statement obtained after two times of modifications, and the two times of modifications are respectively used to add the column permission and the row permission of T1. Finally, all modified SQL statements are sent to a background database for execution, the user is allowed to access data within a permission range. This controls data access of the user, prevents sensitive data from being leaked, provides security assurance for data access, and avoids an information leakage risk to some extent. In other words, after that the column permission is set for T1 is determined in step 406, step 405 is performed again, the SQL statement is modified, and then step 407 is performed.

Certainly, if that the column permission is not set for T1 is determined in step 406, modifying of the SQL statement in step 405 does not need to be performed again, and step 407 is directly performed.

Figure 5:
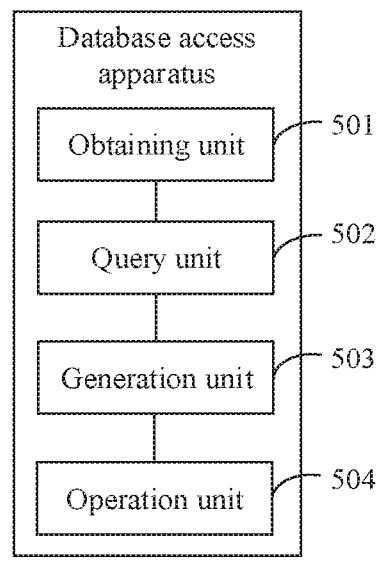
FIG. 5 is another structural block diagram of a database access apparatus according to an embodiment of the present disclosure.

An embodiment of the present disclosure provides a database access apparatus. The database access apparatus may be the database access apparatus in the embodiments of the present disclosure, for example, the database access apparatus shown in FIG. 1. When various functional modules are divided based on various corresponding functions, FIG. 5 is a possible schematic structural diagram of the communications device. As shown in FIG. 5, the database access apparatus includes an obtaining unit 501, a querying unit 502, a generation unit 503, and an operation unit 504.

The obtaining unit 501 is configured to support the database access apparatus to perform step 301 and step 401 in the foregoing embodiment, and/or is used in another process of the technology described in this specification.

The query unit 502 is configured to support the database access apparatus to perform step 302 and step 402 in the foregoing embodiment, and/or is used in another process of the technology described in this specification.

The generation unit 503 is configured to support the database access apparatus to perform step 303 and step 405 in the foregoing embodiment, and/or is used in another process of the technology described in this specification.

The operation unit 504 is configured to support the database access apparatus to perform step 304 and step 407 in the foregoing embodiment, and/or is used in another process of the technology described in this specification.

It should be noted that all related content of the steps in the foregoing method embodiments may be cited in function descriptions of corresponding function modules. Details are not described herein.

Figure 6:
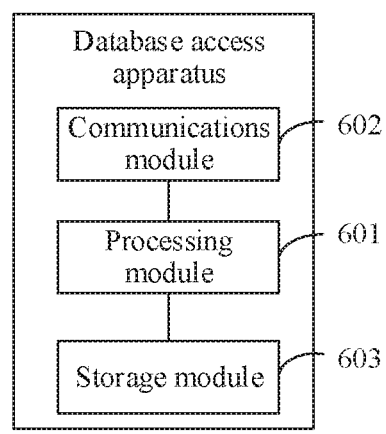
FIG. 6 is another structural block diagram of a database access apparatus according to an embodiment of the present disclosure.

For example, when an integrated unit is used, FIG. 6 is a schematic structural diagram of a database access apparatus according to an embodiment of this application. In FIG. 6, the database access apparatus includes a processing module 601 and a communications module 602. The processing module 601 is configured to control and manage an action of the database access apparatus, for example, perform the steps performed by the query unit 502, the generation unit 503, and the operation unit 504, and/or is configured to perform another process of the technology described in this specification. The communications module 602 is configured to support the database access apparatus to interact with another device, for example, perform the steps performed by the obtaining unit 501. As shown in FIG. 6, the database access apparatus may further include a storage module 603. The storage module 603 is configured to store program code and data of the database access apparatus.

When the processing module 601 is a processor, the communications module 602 is a transceiver, and the storage module 603 is a memory, the database access apparatus may be the database access apparatus shown in FIG. 2.

The foregoing description about implementations allows a person skilled in the art to understand that, for ease and brevity of description, division of the foregoing function modules is used as an example for description. In actual application, the foregoing functions may be allocated to different modules and implemented based on a requirement. In other words, an inner structure of the database access apparatus is divided into different function modules to implement all or some of the functions described above.

In the several embodiments provided in this application, it should be understood that the disclosed database access apparatus and method may be implemented in another manner. For example, the described database access apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    obtaining a first data operation instruction for accessing a target data triggered by a first user and permission setting information, the permission setting information comprising information indicating whether the first user is permitted to access a first data of the target data;
    generating a second data operation instruction based on the first data operation instruction and the permission setting information to operate the target data, generating the second data operation instruction comprising adding an execution condition to the first data operation instruction to obtain the second data operation instruction in response to the permission setting information indicating that the first user is prohibited from operating at least one target field in the target data, wherein in the execution condition, a value corresponding to the at least one target field operated by the first user is null; and
    executing the second data operation instruction to operate data in the target data.

2. The method according to claim 1, wherein the first data operation instruction carries an identifier of the target data, and the method further comprising:
    querying the permission setting information based on the identifier of the target data.

3. The method according to claim 2, the method further comprising:
    determining a first permission setting of the first user to operate the target data based on the permission setting information, wherein the permission setting information comprises an identifier of at least one data and a permission setting of at least one user to operate the at least one data, the at least one data comprises the target data, and the at least one user comprises the first user.

4. The method according to claim 3, wherein generating the second data operation instruction comprises:
    generating the second data operation instruction based on the first data operation instruction and the first permission setting of the first user to operate the target data.

5. The method according to claim 1, wherein executing the second data operation instruction comprises:
    executing the second data operation instruction to operate the data in the target data within a target range, wherein the target range is a range of data that is allowed to be accessed by the first user to operate the target data.

6. The method according to claim 1, wherein executing the second data operation instruction to operate the data in the target data comprises:
    operating N columns of data in at least one field in the target data other than the at least one target field, wherein N is an integer greater than or equal to 1.

7. The method according to claim 6, wherein the method further comprises:

forbidding the first user from operating M columns of data in the at least one target field in the target data, wherein M is an integer greater than or equal to 1.

8. The method according to claim 1, wherein executing the second data operation instruction to operate data in the target data comprises executing the second data operation instruction to operate data directly in the target data.

9. The method according to claim 1, wherein generating the second data operation instruction comprises:
adding the execution condition to the first data operation instruction to obtain the second data operation instruction in response to the permission setting information indicating that the first user is allowed to operate data in the target data having a target field meeting a preset condition, wherein in response to the target field in the execution condition meeting the preset condition, the second data operation instruction indicates that the first user is allowed to operate the target data with the target field meeting the preset condition.

10. The method according to claim 9, wherein executing the second data operation instruction to operate the data in the target data comprises:
operating Q rows of data, in the target data, whose target field meets the preset condition, wherein Q is an integer greater than or equal to 1.

11. An apparatus, comprising a processor; and a non-transitory computer-readable storage medium storing a program to be executed by the processor, the program including instructions that, when executed by the processor, cause the apparatus to:
obtain a first data operation instruction for accessing a target data triggered by a first user and permission setting information, the permission setting information comprising information indicating whether the first user is permitted to access a first data of the target data;
generate a second data operation instruction based on the first data operation instruction and the permission setting information to operate the target data by adding an execution condition to the first data operation instruction in response to the permission setting information indicating that the first user is prohibited from operating at least one target field in the target data, wherein in the execution condition, a value corresponding to the target field operated by the first user is null; and
execute the second data operation instruction to operate data in the target data.

12. The apparatus according to claim 11, wherein the first data operation instruction carries an identifier of the target data, and the instructions further cause the apparatus to query permission setting information based on the identifier of the target data.

13. The apparatus according to claim 12, the instructions further cause the apparatus to determine a first permission setting of the first user to operate the target data based on the permission setting information, wherein the permission setting information comprises an identifier of at least one data and a permission setting of at least one user to operate the at least one data, the at least one data comprises the target data, and the at least one user comprises the first user.

14. The apparatus according to claim 13, the instructions further cause the apparatus to generate the second data operation instruction based on the first data operation instruction and the first permission setting of the first user to operate the target data.

15. The apparatus according to claim 11, the instructions further cause the apparatus to execute the second data operation instruction to operate the data in the target data within a target range, wherein the target range is a range of data that is allowed to be accessed by the first user to operate the target data.

16. The apparatus according to claim 11, wherein the instructions further cause the apparatus to: operate N columns of data in at least one field in the target data other than the at least one target field, wherein N is an integer greater than or equal to 1.

17. The apparatus according to claim 11, wherein the instructions further cause the apparatus to forbid the first user from operating M columns of data in the at least one target field in the target data, wherein M is an integer greater than or equal to 1.

18. The apparatus according to claim 11, wherein the instructions further cause the apparatus to add the execution condition to the first data operation instruction to obtain the second data operation instruction in response to the permission setting information indicating that the first user is allowed to operate data in the target data having a target field meeting a preset condition, wherein, in response to the target field in the execution condition meeting the preset condition, the second data operation instruction indicates that the first user is allowed to operate the target data with the target field meeting the preset condition.

19. The apparatus according to claim 18, wherein the instructions further cause the apparatus to operate Q rows of data, in the target data, whose target field meets the preset condition, wherein Q is an integer greater than or equal to 1.

20. A non-transitory computer readable medium with computer readable instructions stored thereon, wherein the instructions, when executed by at least one processor, cause the at least one processor to perform the steps of:
obtaining a first data operation instruction for accessing a target data triggered by a first user and permission setting information, the permission setting information comprising information indicating whether the first user is permitted to access a first data of the target data;
generating a second data operation instruction based on the first data operation instruction and the permission setting information to operate the target data, generating the second data operation instruction comprising adding an execution condition to the first data operation instruction to obtain the second data operation instruction in response to the permission setting information indicating that the first user is prohibited from operating at least one target field in the target data, wherein in the execution condition, a value corresponding to the at least one target field operated by the first user is null; and
executing the second data operation instruction to operate data in the target data.

* * * * *